United States Patent [19]

Arman

[11] 3,733,643
[45] May 22, 1973

[54] WINDSHIELD WIPER FOR AUTOMOTIVES

[76] Inventor: Dario Arman, P.zza Adriano 15, Torono, Italy

[22] Filed: Oct. 1, 1971

[21] Appl. No.: 185,717

[30] Foreign Application Priority Data

Oct. 26, 1970 Italy..............................70577 A/70

[52] U.S. Cl................................................15/250.42
[51] Int. Cl..............................B60s 1/04, B60s 1/40
[58] Field of Search.......................18/250.36, 250.42

[56] References Cited

UNITED STATES PATENTS 2,807,821 10/1957 Scinta..................................15/250.42
3,029,460 4/1962 Hoyler................................15/250.42

FOREIGN PATENTS OR APPLICATIONS 1,109,971 4/1968 Great Britain........................15/250.2
1,188,729 4/1970 Great Britain

*Primary Examiner*—Peter Feldman
*Attorney*—Clario Ceccon

[57] ABSTRACT

An improved automotive windshield wiper blade which simplifies the connections between the central bar of the blade support and the rocker arms. This device comprises a pair of brackets and a pair of bridges, both with superimposed cavities therein and internal projections within said cavities to fittingly engage a plurality of seats provided at the ends of said central bar, at the end of the rocker arms and at a bend formed in the middle of the rocker arms. This improved structure permits noiseless operation of the wiper even at high travelling speed.

1 Claim, 10 Drawing Figures

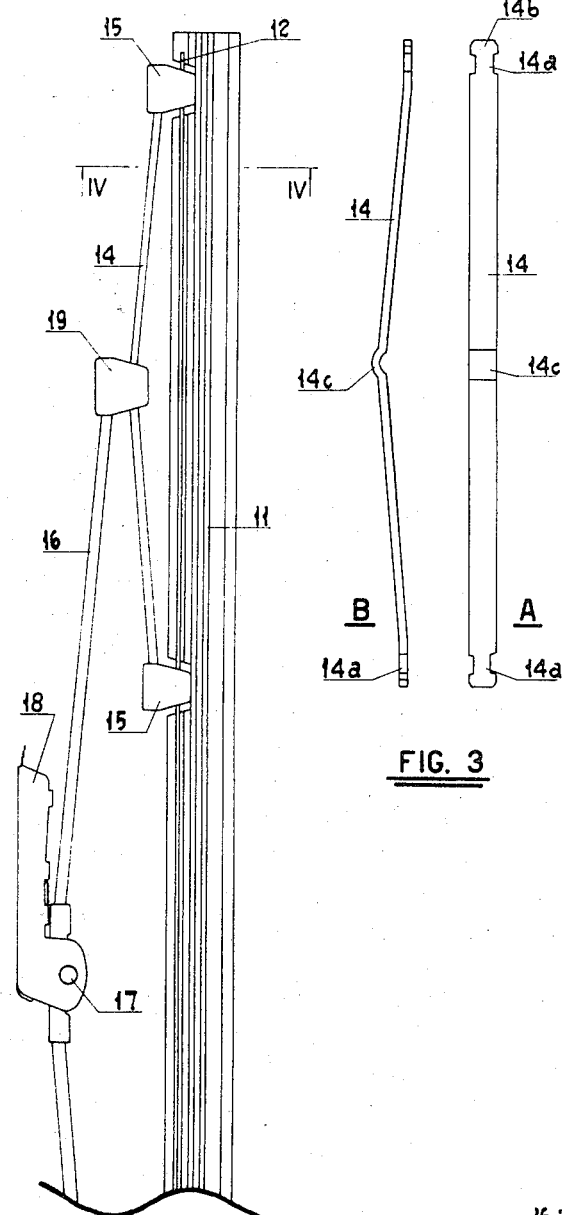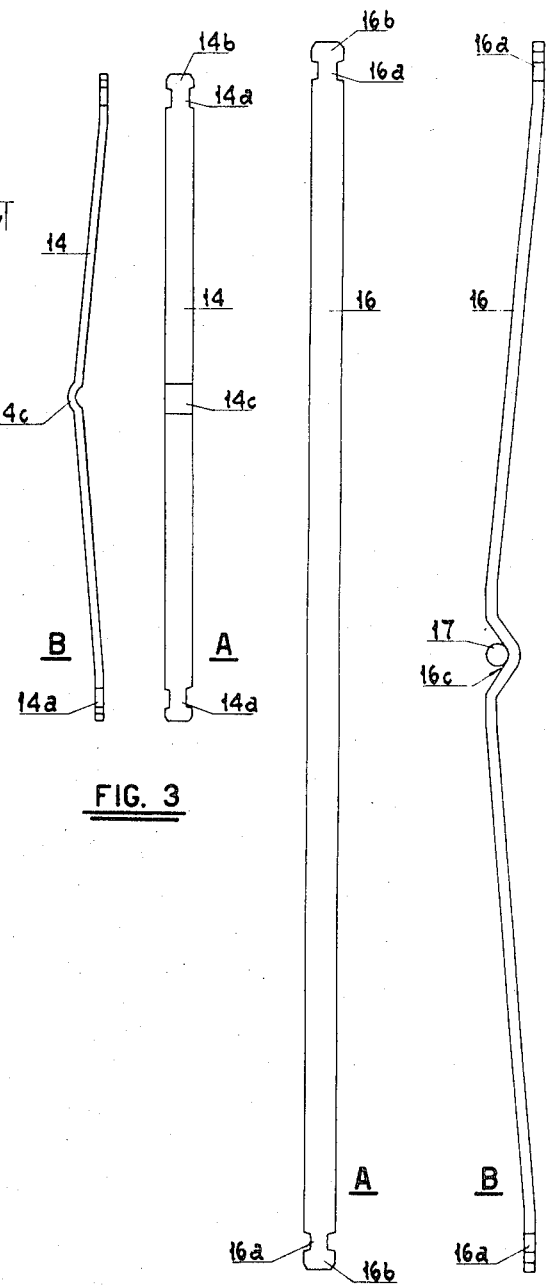

WINDSHIELD WIPER FOR AUTOMOTIVES

Windshield wiper blades used on motor vehicles are the object of continuous study and continuous improvements because of the requirements dictated especially by the various curvatures of the windshield glass and by the desire to maintain unchanged the blades' operating features at high travelling speeds.

Together with reliable operation under the various use conditions, the windshield wiper blades must not be noisy when in operation and, therefore, all the connections between the different elements which form the support of the wiper blade have to permit the retention of the correct position of the wiper blade, particularly during the reversing phase of the arcuated movement and without excessive clearance of the elements, which excessive clearance would cause troublesome noises and the rapid wear of the wiper blades.

Furthermore, the wiper blades have to be manufactured at a cost which takes into consideration the time required for assembling of the various components.

With these objects and manufacturing requirements in mind, the present invention provides an improvement in windshield wiper blades for motor vehicles in general, characterized by the fact that the articulations or connections between the elements forming the support for the wiper blade, are achieved by tailor-fitting one or more pieces with respect to suitably shaped brackets, stamped from suitable synthetic material and provided with inner cavities for receiving and retaining at specifically determined points the members to be connected.

Another feature of the present invention resides in the fact that the entire articulated support for the wiper blade is provided by flat rods of rectangular cross section and having bends and/or tapers or reductions of their width only, in correspondence with the connection points formed by the brackets.

A further feature of the invention provides that each bracket presents in its inner cavities symmetrical and opposed projections which are coplanar and parallel to the operating plane of wiper blade and/or normal with respect to said plane.

These and other objects of the invention will become more apparent from the following detailed description thereof referred to the accompanying illustrative drawings, in which:

FIG. 1 is a partial side view of the wiper blade of the invention;

FIGS. 2 (A and B) and 3 (A and B), respectively, are planar and respectively side views of the central bar and one of the two symmetrical rocker arms of the wiper blade support;

Figure 4:
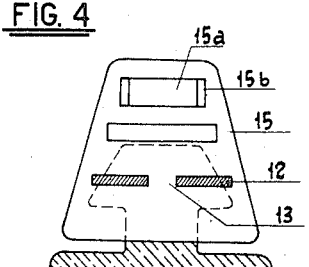
FIG. 4 is an exploded, cross sectional view of the blade taken along line IV—IV of FIG. 1.

Referring now to FIGS. 1 to 4 of the drawings, the back support for the wiper blade 11 comprises: a pair of conventional laminae 12 located within the symmetrical and longitudinal cavities formed on the sides of rubber member 13 opposed to the wiper blade 11; a pair of rocker arms 14, only one being represented in FIG. 1; a pair of bridges 15 to engage each rocker arm 14 with respect to the wiper blade; a central bar 16 connected at 17 to conventional member 18 and connecting by snap-action the wiper blade and the end of the corresponding oscillating arm; a pair of brackets 19 to connect the ends of bar 16 to the center of rocker arms 14.

As previously stated, one of the features of the invention resides in that the central bar 16 and the rocker arms 14 having a rectangular cross section, that is, forming an antiwind support, are connected to one another and to the other members of the support without pivots passing through perforated seats. The mutual connection of the parts forming the back support of the rubber blade is achieved by tailor-fitting action of the same within and with respect to bridges and brackets made from pre-stamped synthetic material, and to this end, the central bar and the rocker arms have their ends provided with lateral or side notches which form a substantially T-shaped profile.

In effect, the central bar 16, as well as each rocker arm 14, have their ends provided with symmetrical seats formed by opposed notches 16a and 14a, respectively, in the narrow faces, while the terminal profiles 16b and 14b, respectively have chamfered corners. Further, the central bar 16 is provided with a central depression 16c which forms the swinging seat for the pivot 17, relative to member 18, while each rocker arm 14 is provided with a centrally located bend 14c to engage by proper fitting the corresponding bracket 19.

Figure 5:
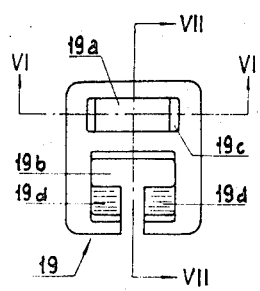
FIG. 5 is an enlarged frontal view of one of the brackets connecting each end of the central bar to the back of the corresponding rocker arm.
Figure 6:
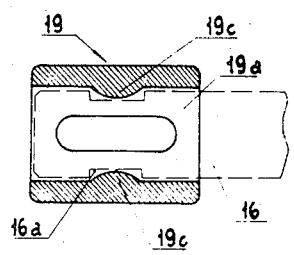
FIG. 6 is a sectional view of same bracket, taken along a horizontal plane passing through line VI—VI of FIG. 5.
Figure 9:
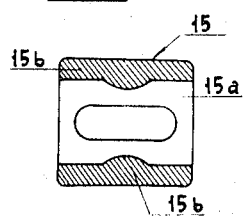
FIG. 9 is a cross sectional view of the same bridge taken along line IX—IX of FIG. 8.
Figure 7:
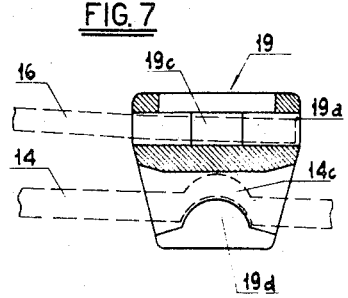
FIG. 7 is another cross sectional view of the same bracket taken along line VII—VII of FIG. 5.
Figure 10:
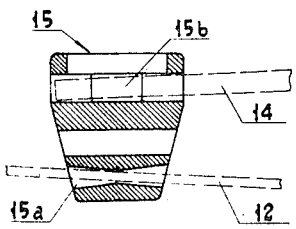
FIG. 10 is another cross sectional view of the same bridge taken along line X—X of FIG. 8.
Figure 8:
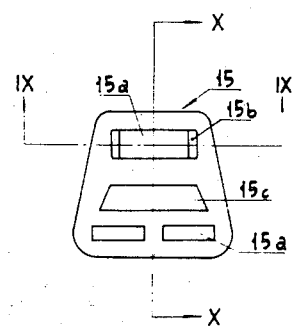
FIG. 8 is a frontal view of a bridge connecting the end of a rocker arm to the blade-carrying frame.

As represented in FIGS. 5, 6 and 7, each of the two brackets 19 is formed by a body with two superimposed cavities 19a, 19b; the upper cavity has a closed perimeter and presents a pair of symmetrical internal projections 19c of cylindrical profile, intended to engage the cavities 16a provided in the corresponding end of bar 16; the cavity 19b instead has an open profile and is equally provided with a pair of projections 19a similar to the preceding ones but oriented at 90° with respect thereto; astride of projections 19d, there is mounted the bend 14c of the corresponding rocker arm.

As seen from FIGS. 6 and 7, the bar 16 and each rocker arm 14 have such dimensions, namely width and thickness as to be contained with a moderate clearance within the corresponding cavities 19a, 19b where they are fitted or inserted through a slight resilient deformation of bracket 19, within which they remain engaged due to presence of projections 19c, 19d which engage seats 16a and bend 14c, respectively.

Each bridge 15, see FIGS. 4, 8, 9, 10, comprises cavity 15a, identical to cavity 19a, that is, provided with opposed and symmetrical internal projections 15b for engaging seats 14a formed on the sides of the corresponding end of one of the bridges 14; a cavity 15c forming a discharge to avoid back-suction during the stamping of the bridge; a pair of rectangular seats 15d to engage the laminae 12 which, in turn, engage stem 13 which extends the whole length of the rubber section.

From the foregoing description it is evident that assembling of the wiper blade support constructed according to the invention is quite rapid and completely free from any difficulty. Furthermore, both central bar 16 and rocker arms 14, as well as the laminae 12, are easily made by a punching operation, while bridges 15 and brackets 19 are equally easily made by a stamping operation, thus reducing considerably manufacturing costs.

As already stated, the wiper blade is completely free from noise when in operation. The connections formed by the bridges 15 and the brackets 19 are rustproof and self-lubricating, hence assuring excellent operation of the support under any condition. Also to be noted is that the wiper blade is free from wind-caused malfunctions, thus being suitable for vehicles travelling at high speeds.

The improvements according to the present invention are not limited to the present description and illustrations, particularly as it concerns the structural conformation of the back support, but are capable of alterations and modifications within the scope and spirit of the invention.

What is claimed is:

1. In an automobile windshield wiper having a resilient blade including elongated laminae means, an arm for oscillating the blade and a connecting member having a pivot pin, improved means for connecting the blade to the pivot pin, said improved means comprising:

a. a thin, elongated central bar having a substantially rectangular transverse cross section, a centrally located transversely extending recess for engaging the pivot pin of the connecting member and a pair of opposed, notched seats formed on the side edges proximate each end of said central bar;

b. a pair of plastic brackets one of which is mounted proximate each end of said central bar, each said bracket including a first cavity therein for receiving an end of said central bar, the side walls of said first cavity including a pair of inwardly directed opposed projections for engaging the pair of notches in each said seat of said central bar, and a second cavity therethrough, said second cavity being positioned below and extending in substantially the same direction as said first cavity in each said bracket, said second cavity including a pair of laterally spaced apart upwardly directed projections on the bottom wall thereof;

c. a pair of thin, elongated rocker arms each of which has a substantially rectangular transverse cross section, a centrally located transversely extending recess for engaging the upwardly directed projections on the bottom wall of each said second cavity in each said bracket and a pair of opposed, notched seats formed on the side edges proximate each end of each said rocker arm; and d. two pair of plastic bridges, one of which is mounted proximate each said end of each said rocker arm, each said bridge including a first cavity therein for receiving an end of each said rocker arm, the side walls of each said first cavity in each said plastic bridge including a pair of inwardly directed, opposed projections for engaging the pair of notches in each said seat of each said rocker arm and a second cavity therethrough, said second cavities being positioned below and extending in substantially the same direction as said first cavities in each said bridge, each said second cavity including a pair of opposed projections, one of which said projections is in the upper wall of each said second cavity and the other of said projections being in the lower wall of each said second cavity for pivotly supporting the laminae means proximate the ends thereof.

* * * * *